United States Patent
Lo et al.

(10) Patent No.: US 8,179,991 B2
(45) Date of Patent: *May 15, 2012

(54) NEAR-OPTIMAL LOW-COMPLEXITY DECODING OF SPACE-TIME CODES FOR FIXED WIRELESS APPLICATIONS

(75) Inventors: Titus Lo, Redmond, WA (US); Vahid Tarokh, Madison, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 500 days.

This patent is subject to a terminal disclaimer.

(21) Appl. No.: 12/410,291

(22) Filed: Mar. 24, 2009

(65) Prior Publication Data

US 2009/0180569 A1    Jul. 16, 2009

Related U.S. Application Data

(63) Continuation of application No. 11/371,173, filed on Mar. 8, 2006, now Pat. No. 7,526,040, which is a continuation of application No. 10/838,553, filed on May 4, 2004, now Pat. No. 7,046,737, which is a continuation of application No. 10/234,407, filed on Sep. 3, 2002, now Pat. No. 6,741,635, which is a continuation of application No. 09/690,542, filed on Oct. 17, 2000, now Pat. No. 6,470,043, which is a continuation of application No. 09/063,765, filed on Apr. 21, 1998, now Pat. No. 6,188,736.

(60) Provisional application No. 60/068,613, filed on Dec. 23, 1997.

(51) Int. Cl.
  *H04B 7/02*    (2006.01)

(52) U.S. Cl. .................................................. 375/267

(58) Field of Classification Search .................. 375/141, 375/142, 144, 148, 267, 347
See application file for complete search history.

(56) References Cited

U.S. PATENT DOCUMENTS

| 3,633,107 | A | 1/1972 | Brady |
| 3,978,408 | A | 8/1976 | Gupta et al. |

(Continued)

FOREIGN PATENT DOCUMENTS

CA    2252664    11/1997

(Continued)

OTHER PUBLICATIONS

Foschini, "Layered Space-Time Architecture for Wireless Communication in a Fading Environment When Using Multi-Element Antennae", Bell Tech Labs J; pp. 41-59 (1996).

(Continued)

*Primary Examiner* — Don N Vo
(74) *Attorney, Agent, or Firm* — Parks IP Law LLC; Jennifer P. Medlin, Esq.

(57) ABSTRACT

An improved multi-antenna receiver is realized for detecting signals transmitted by a multi-antenna transmitter by summing signals received at the plurality of receiver antennas after multiplying each by a respective constant. The summed signal is applied to a maximum likelihood detector. The respective constants, $\lambda_j$, where j is an index designating a particular receiver antenna, are determined by evaluating the largest eigenvector of the matrix A, where $\Lambda$ is a vector containing values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

12 Claims, 2 Drawing Sheets

U.S. PATENT DOCUMENTS

| | | | |
|---|---|---|---|
| 4,001,692 A | 1/1977 | Fenwick et al. | |
| 4,099,121 A | 7/1978 | Fang | |
| 4,369,516 A | 1/1983 | Byrns | |
| 4,567,464 A | 1/1986 | Siegel et al. | |
| 4,577,332 A | 3/1986 | Brenig | |
| 4,675,880 A | 6/1987 | Davarian | |
| 4,733,402 A | 3/1988 | Monsen | |
| 4,763,331 A | 8/1988 | Matsumoto | |
| 4,953,183 A | 8/1990 | Bergmans et al. | |
| 5,022,053 A | 6/1991 | Chung et al. | |
| 5,029,185 A | 7/1991 | Wei | |
| 5,088,113 A | 2/1992 | Wei | |
| 5,089,823 A * | 2/1992 | Vasile | 342/383 |
| 5,101,501 A | 3/1992 | Gilhousen et al. | |
| 5,109,390 A | 4/1992 | Gilhousen et al. | |
| 5,170,413 A | 12/1992 | Hess et al. | |
| 5,202,903 A | 4/1993 | Okanoue | |
| 5,274,844 A | 12/1993 | Harrison et al. | |
| 5,283,780 A | 2/1994 | Schuchman et al. | |
| 5,305,353 A | 4/1994 | Weerackody | |
| 5,319,677 A | 6/1994 | Kim | |
| 5,396,518 A | 3/1995 | How | |
| 5,416,797 A | 5/1995 | Gilhousen et al. | |
| 5,418,798 A | 5/1995 | Wei | |
| 5,442,627 A | 8/1995 | Viterbi et al. | |
| 5,457,712 A | 10/1995 | Weerackody | |
| 5,461,646 A | 10/1995 | Anvari | |
| 5,461,696 A | 10/1995 | Frank et al. | |
| 5,479,448 A | 12/1995 | Seshadri | |
| 5,481,572 A | 1/1996 | Skold et al. | |
| 5,499,272 A | 3/1996 | Bottomley | |
| 5,553,102 A | 9/1996 | Jasper et al. | |
| 5,675,590 A | 10/1997 | Alamouti | |
| 5,790,570 A | 8/1998 | Heegard et al. | |
| 5,848,103 A | 12/1998 | Weerackody | |
| 5,859,870 A | 1/1999 | Tsujimoto | |
| 5,933,421 A | 8/1999 | Alamouti et al. | |
| 5,943,372 A | 8/1999 | Gans et al. | |
| 5,949,833 A | 9/1999 | Weerackody | |
| 5,952,968 A * | 9/1999 | McDowell | 342/383 |
| 5,960,039 A | 9/1999 | Martin et al. | |
| 5,991,331 A | 11/1999 | Chennakeshu et al. | |
| 6,031,474 A | 2/2000 | Kay et al. | |
| 6,034,987 A | 3/2000 | Chennakeshu et al. | |
| 6,038,263 A | 3/2000 | Kotzin et al. | |
| 6,069,912 A * | 5/2000 | Sawahashi et al. | 375/142 |
| 6,088,408 A | 7/2000 | Calderbank et al. | |
| 6,094,465 A | 7/2000 | Stein et al. | |
| 6,097,771 A | 8/2000 | Foschini | |
| 6,115,427 A | 9/2000 | Calderbank et al. | |
| 6,144,711 A | 11/2000 | Raleigh et al. | |
| 6,154,485 A | 11/2000 | Harrison | |
| 6,173,005 B1 | 1/2001 | Kotzin et al. | |
| 6,178,196 B1 | 1/2001 | Naguib et al. | |
| 6,185,258 B1 | 2/2001 | Alamouti et al. | |
| 6,185,266 B1 | 2/2001 | Kuchi et al. | |
| 6,188,736 B1 | 2/2001 | Lo et al. | |
| 6,298,082 B1 | 10/2001 | Harrison | |
| 6,304,581 B1 | 10/2001 | Chen et al. | |
| 6,317,411 B1 | 11/2001 | Whinnett et al. | |
| 6,317,466 B1 | 11/2001 | Foschini et al. | |
| 6,327,299 B1 | 12/2001 | Meszko | |
| 6,377,631 B1 | 4/2002 | Raleigh | |
| 6,393,074 B1 | 5/2002 | Mandyam et al. | |
| 6,470,043 B1 | 10/2002 | Lo et al. | |
| 6,501,803 B1 | 12/2002 | Alamouti et al. | |
| 6,542,556 B1 | 4/2003 | Kuchi et al. | |
| 6,549,585 B2 | 4/2003 | Naguib et al. | |
| 6,741,635 B2 | 5/2004 | Lo et al. | |
| 7,046,737 B2 | 5/2006 | Lo et al. | |
| 7,526,040 B2 | 4/2009 | Lo et al. | |
| 2011/0019771 A1* | 1/2011 | Raleigh et al. | 375/299 |

FOREIGN PATENT DOCUMENTS

| | | |
|---|---|---|
| CA | 2302289 | 3/1998 |
| CA | 23052289 | 3/1998 |
| CA | 2276207 | 2/2003 |
| DE | 29824760 | 6/2002 |
| DE | 29824761 | 6/2002 |
| DE | 29824762 | 6/2002 |
| DE | 29824765 | 6/2002 |
| EP | 0767546 | 4/1997 |
| EP | 2237706 | 8/1998 |
| EP | 1016228 | 6/2003 |
| GB | 2280575 | 2/1995 |
| GB | 2290010 | 12/1995 |
| GB | 2311445 | 9/1997 |
| GB | 2313237 | 11/1997 |
| JP | 63286027 | 11/1998 |
| WO | 9120142 | 12/1991 |
| WO | 9522214 | 8/1995 |
| WO | 9724849 | 7/1997 |
| WO | 9741670 | 11/1997 |
| WO | 9809385 | 3/1998 |
| WO | 9914871 | 3/1999 |
| WO | 0011806 | 3/2000 |
| WO | 0018056 | 3/2000 |
| WO | 0049780 | 8/2000 |
| WO | 0051265 | 8/2000 |
| WO | 0119013 | 3/2001 |
| WO | 0154305 | 7/2001 |
| WO | 0156218 | 8/2001 |
| WO | 0163826 | 8/2001 |
| WO | 0169814 | 9/2001 |

OTHER PUBLICATIONS

Foschini et al., "On Limits of Wireless Communications in a Fading Environment When Using Multiple Antennas", Wireless Personal Communications; 6:311-335 (1998).

Hinderling et al., "CDMA Mobile Station Modem ASIC", IEEE Customized Integrated Circuits Conf; pp. 10-2.1-10.2.5 (1992).

Kerr et al., "The CDMA Digital Cellular System: An ASIC Overview", IEEE Customized Integrated Circuits Conf; pp. 10.1.1-10.1.7 (1992).

Pikhotz et al., "Theory of Spread Spectrum Communications—A Tutorial", IEEE Transactions on Communications; 30(5):857-884 (1992).

Tarokh et al., "Space-Time Codes for High Data Rate Wireless Communication: Performance Criteria and Code Construction", IEEE Trans Info Theory; v. 44 (1998).

Tarokh et al., "Space Time Codes for High Data Rate Wireless Communication: Performance Criteria in the Presence of Channel Estimation Errors, Mobility, and Multiple Paths", IEEE Transactions on Communications; 47 (2):199-207 (1999).

Winters, "The Diversity Gain of Transmit Diversity in Wireless System with Rayleigh Fading", AT&T Bell Labs New Orleans Supercomm ICC; pp. 1121-1125 (1994).

Wittneben, "A New Bandwidth Efficient Transmit Antenna Modulation Diversity Scheme for Linear Digital Modulation", Proc IEEE ICC; pp. 1630-1634 (1993).

Wittneben, "BaseStation Modulation Diversity for Digital Simulcast", Proc IEE VTC; pp. 848-853 (1991).

Cavers, "An Analysis of Pilot Symbol Assisted Modulation for Rayleigh Fading Channels", IEEE Transactions on Vehicular Tech; 40(4):686-693 (1991).

Naguib et al., "A Space-Time Coding Modem for High-Data-Rate Wireless Communications", IEEE J Selected Areas in Communications; pp. 1459-1478 (1998).

Sampei et al., "Rayleigh Fading Compensation Method for 16QAM in Digital Land Mobile Radio Channels", Proc IEEE Vehicular Tech Conf; pp. 640-646 (1989).

Seshadri et al., "Advanced Techniques for Modulation, Error Correction, Channel Equalization and Diversity", AT&T Tech J; 47(4):48-63 (1993).

Seshadri et al., "Space-Time Codes for Wireless Communication: Code Construction", IEEE Vehicular Tech Conf; pp. 637-641 (1997).

Ungerboeck, "Channel Coding with Multilevel/Phase Signals", IEEE Transaction on Info Theory; IT28(1):55-67 (1982).

Weerackody, "Diversity for the Direct-Sequence Spread Spectrum System Using Multiple Transmit Antennas", IEEE Conf on Communications; 3:1775-1779 (1993).

Winters et al., "The Impact of Antenna Diversity on the Capacity of Wireless Communications Systems", IEEE Transactions on Communications; 42(2)1740-1751 (1994).

Blanco et al., "On the Optimization of Simple Switched Diversity Receivers", IEEE Conf on Communications and Power; pp. 114-117 (1978).

Blanco et al., "Performance and Optimization of Switched Diversity Systems for the Detection of Signals with Rayleigh Fading", IEEE Transactions on Communications; 27(12):18871895 (1979).

Seshadri et al., "Two Signaling Schemes for Improving the Error Performance of Frequency Division Duplex Transmission Using Transmitter Antenna Diversity", Intl J Wireless Information Networks; I(1):46-60 (1994).

Calderbank et al., "Space-Time Codes for Wireless Communications", IEEE ISIT; p. 146 (1997).

Hiroike et al., "Combined Effects of Phase Sweeping Transmitter Diversity and Channel Coding", IEEE Transaction on Vehicular Tech; 41(2):170-176 (1992).

* cited by examiner

NEAR-OPTIMAL LOW-COMPLEXITY DECODING OF SPACE-TIME CODES FOR FIXED WIRELESS APPLICATIONS

CROSS-REFERENCE TO RELATED APPLICATIONS

This application is a continuation of U.S. patent application Ser. No. 11/371,173 filed Mar. 8, 2006 (now U.S. Pat. No. 7,526,040), which is a continuation of U.S. patent application Ser. No. 10/838,553, filed May 4, 2004 (now U.S. Pat. No. 7,046,737), which is a continuation of U.S. patent application Ser. No. 10/234,407, filed Sep. 3, 2002 (now U.S. Pat. No. 6,741,635), which is a continuation of U.S. patent application Ser. No. 09/690,542, filed Oct. 17, 2000 (now U.S. Pat. No. 6,470,043), which is a continuation of U.S. patent application Ser. No. 09/063,765, filed Apr. 21, 1998 (now U.S. Pat. No. 6,188,736), which claims the benefit of U.S. Provisional Application No. 60/068,613, filed Dec. 23, 1997.

BACKGROUND

This invention relates to wireless systems and, more particularly, to systems having more than one antenna at the receiver and at the transmitter.

Physical constraints as well as narrow bandwidth, co-channel interference, adjacent channel interference, propagation loss and multi-path fading limit the capacity of cellular systems. These are severe impairments, which liken the wireless channel to a narrow pipe that impedes the flow of data. Nevertheless, interest in providing high speed wireless data services is rapidly increasing. Current cellular standards such as IS-136 can only provide data rates up to 9.6 kbps, using 30 kHz narrowband channels. In order to provide wideband services, such as multimedia, video conferencing, simultaneous voice and data, etc., it is desirable to have data rates in the range of 64-144 kbps.

Transmission schemes for multiple antenna systems may be part of a solution to the problem of the currently available low data rates. Such schemes were first proposed in papers by Wittneben, and by Seshadri and Winters, where the problem was addressed in the context of signal processing.

One prior art arrangement having a single transmitter antenna and multiple receiver antennas is shown in FIG. 1. Each of the receiver antennas receives the transmitted signal via a slightly different channel, where each channel i is characterized by transfer function $\alpha_i$. Using an approach known as "Maximum Ratio Combining," the prior art approach to detection contemplates multiplying each received signal that had been influenced by $\alpha_i$, by the complex conjugate signal, $\alpha_i^*$, summed, and then processed.

In U.S. Pat. No. 6,115,427 titled "Method and Apparatus for Data Transmission Using Space-Time Codes and Multiple Transmit Antennas," filed on May 6, 1997, a coding perspective was adopted to propose space-time coding using multiple transmit and receive antennas. Space-time coding integrates channel coding, modulation, and multiple transmit antennas to achieve higher data rates, while simultaneously providing diversity that combats fading. It may be demonstrated that adding channel coding provides significant gains over the schemes of Wittneben and Seshadri and Winters. In said co-pending application, space-time codes were designed for transmission using 2-4 transmit antennas. These codes perform extremely well in slowly varying fading environments (such as indoor transmission media). The codes have user bandwidth efficiencies of up to 4 bits/sec/Hz which are about 3-4 times the efficiency of current systems. Indeed, it can be shown that the designed codes are optimal in terms of the trade-off between diversity advantage, transmission rate, decoding complexity and constellation size.

It can also be shown that as the number of antennas is increased, the gain increases in a manner that is not unlike a multi-element antenna that is tuned to, say, a particular direction. Unfortunately, however, when maximum likelihood detection is employed at the receiver, the decoding complexity increases when the number of transmit and receive antennas is increased. It would be advantageous to allow a slightly sub-optimal detection approach that substantially reduces the receiver's computation burden.

SUMMARY

Such an approach is achieved with a receiver arrangement where signals received at a plurality of antennas are each multiplied by a respective constant and then summed prior to being applied to a maximum likelihood detector. The respective constants, $\lambda_j$, where j is an index designating a particular receiver antenna, are derived from a processor that determines the largest eigenvector of the matrix A, where $\Lambda$ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

DETAILED DESCRIPTION

Figure 1:
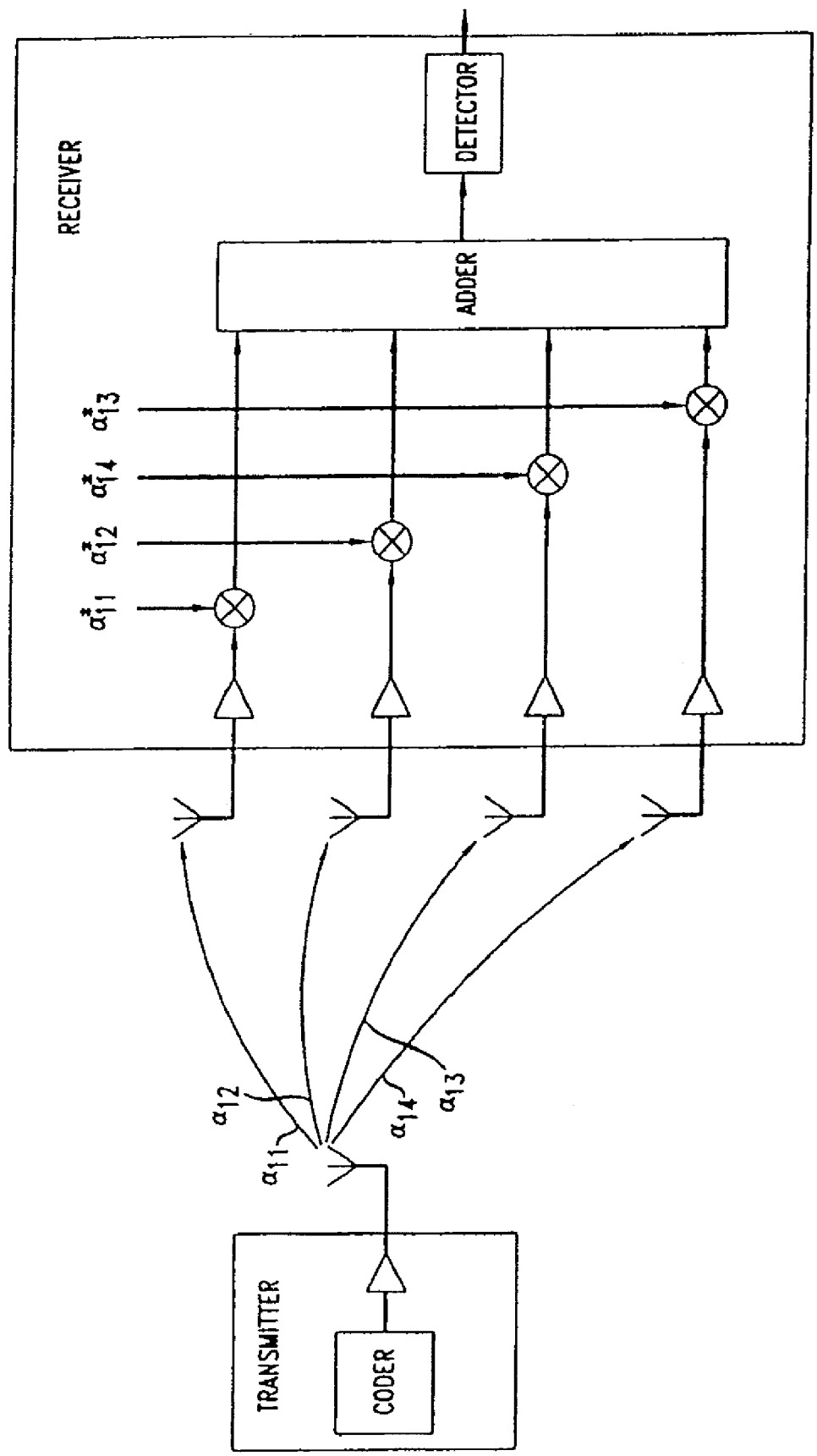
FIG. 1 presents a block diagram of prior Maximal Ratio Combining detection.
Figure 2:
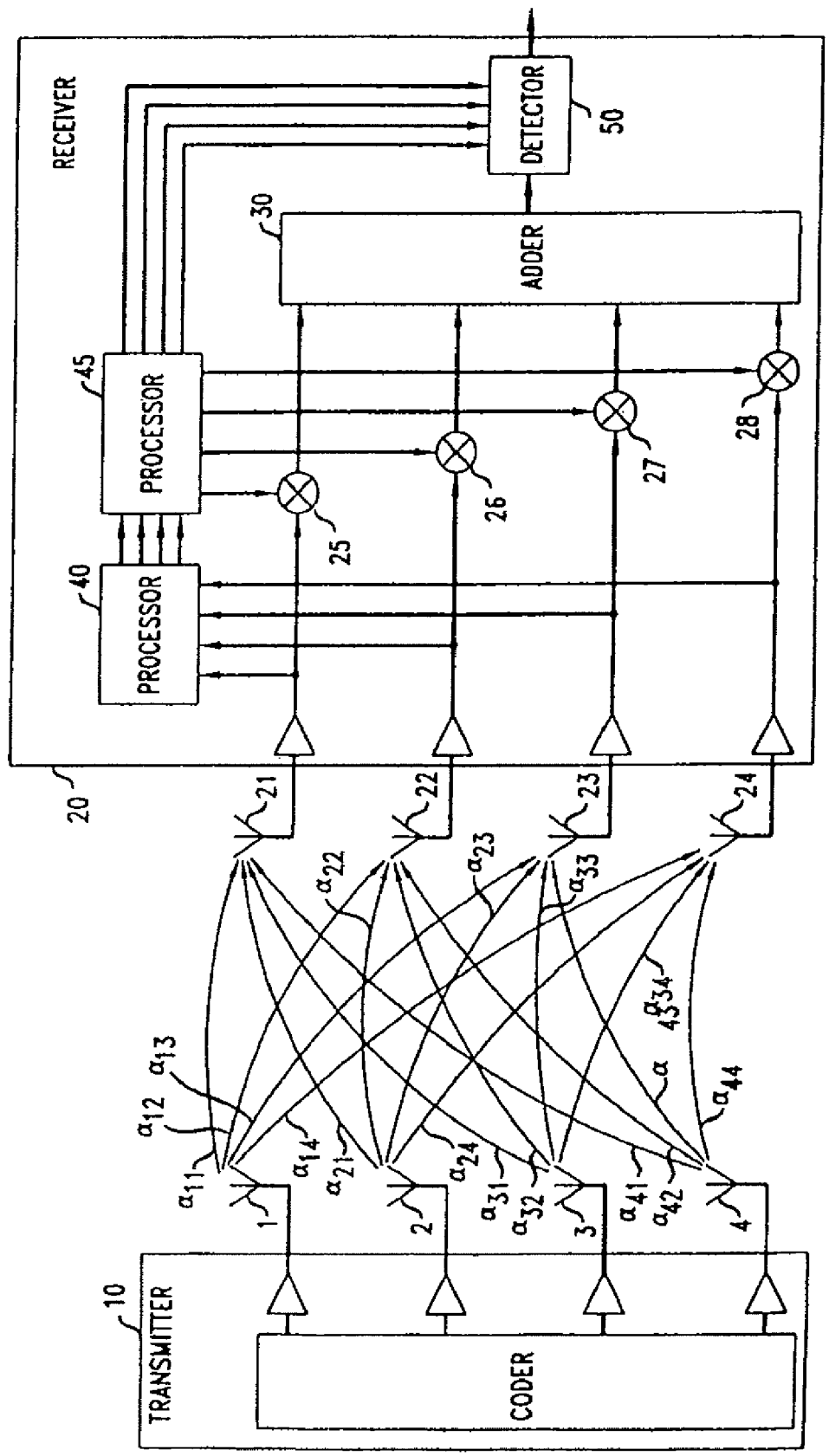
FIG. 2 presents a block diagram of an embodiment including a transmitter having a plurality of antennas, and a receiver having a plurality of antennas coupled to an efficient detection structure.

FIG. 2 presents a block diagram of a receiver in accord with an embodiment of the invention. It includes a transmitter 10 that has an n plurality of transmitting antenna 1, 2, 3, 4, and a receiver 20 that has an m plurality of receiver antennas 21, 22, 23, 24. The signals received by the receiver's antennas are multiplied in elements 25, 26, 27, and 28, and summed in adder 30. More specifically, the received signal of antenna j is multiplied by a value, $\lambda_j$, and summed. The collection of factors $\lambda_j$ can be viewed as a vector $\Lambda$. The outputs of the receiver antennas are also applied to processor 40 which, employing conventional techniques, determines the transfer functions $\alpha_{ij}$ for i=1, 2, 3, . . . , n and j=1, 2, 3, . . . , m. These transfer functions can be evaluated, for example, through the use of training sequences that are sent by the different transmitter antennas, one antenna at a time.

The evaluated $\alpha_{ij}$ signals of processor 40 are applied to processor 45 in FIG. 2 where the multiplier signals $\lambda_j$, j=1, 2, 3, . . . , m are computed. Processor 45 also evaluates a set of combined transfer function Values $\gamma_i$, i=1, 2, 3, . . . , n (which are described in more detail below). Signals $\gamma_i$ of processor 45 and the output signal of adder 30 are applied to detector 50 which detects the transmitted symbols in accordance with calculations disclosed below.

It is assumed that the symbols transmitted by the antennas of transmitter 10 have been encoded in blocks of L time frames, and that fading is constant within a frame. A codeword comprises all of the symbols transmitted within a frame, and it corresponds, therefore, to $$c_1^1 c_1^2 c_1^3 \ldots c_1^4 c_2^1 c_2^2 c_2^3 \ldots c_2^4 c_3^1 c_3^2 c_3^3 \ldots c_3^4 \ldots \\ c_m^1 c_m^2 c_m^3 \ldots c_m^4, \quad (1)$$

where the superscript designates the transmitter's antennas and the subscript designates the time of transmission (or position within a frame).

From the standpoint of a single transmitting antenna, e.g., antenna 1, the signal that is received from antenna 1 in response to a transmitted symbol $c_t^1$ at time interval t is:

$$R_t = c_t^1(\alpha_{11}\lambda_1 + \alpha_{12}\lambda_2 + \alpha_{13}\lambda_3 + \ldots + \alpha_{1m}\lambda_m) \quad (2)$$

$$= c_t^1 \sum_{j=1}^{m} \lambda_j \alpha_{1j}$$

$$= c_t^1 \gamma_1$$

(when noise is ignored). If each $\lambda_j$ value is set to $\alpha^*_{1j}$, (where $\alpha^*_{1j}$ is the complex conjugate of $\alpha_{1j}$) then the received signal would simply be $$R_t = c_t^1 \sum_{j=1}^{m} |\alpha_{1j}|^2 \quad (3)$$

yielding a constructive addition.

Of course, the values of $\lambda_j$ cannot be set to match $\alpha^*_{ij}$ and concurrently to match the values of $\alpha_{ij}$ where i≠1; and therein lies the difficulty. When all n of the transmitting antennas are considered, then the received signal is $$R_t = \sum_{j=1}^{n} \left( c_t^i \sum_{j=1}^{m} \lambda_j \alpha_{ij} \right) \quad (4)$$

$$= \sum_{i=1}^{n} c_t^i \gamma_i$$

In accordance with the present disclosure, the objective is to maximize $$\sum_{i=1}^{n} |\gamma_i|^2$$

because by doing so, signal $R_t$ contains as much information about $c_t^i$, i=1, 2, 3, . . . n as is possible. However, it can be easily shown that if a matrix A is constructed such that $$A = \sum_{i=1}^{n} (\Omega_i^*)^T \Omega_i, \quad (5)$$

where $\Omega_i = (\alpha_{i1}, \alpha_{i2}, \alpha_{i3} \ldots \alpha_{im})$, then $$\sum_{i=1}^{n} |\gamma_i|^2 = \Lambda A (\Lambda^*)^T. \quad (6)$$

The receiver, thus, has to maximize $\Lambda A(\Lambda^*)^T$, subject to the constraint $\|\Lambda\|^2=1$. The solution to this problem is to choose $\Lambda$ to be the eigenvector of A which corresponds to the maximum eigenvalue of A. Accordingly, processor 45 develops the matrix A from the values of $\alpha_{ij}$, finds the eigenvalues of A in a conventional manner, selects the maximum eigenvalue of A, and creates the vector $\Lambda$. Once $\Lambda$ is known, processor 45 develops signals $\gamma_i$ for i=1, 2, 3, . . . , n, where $$\gamma_i = \sum_{j=1}^{m} \lambda_j \alpha_{ij}$$

and applies them to detector 50. Finally, detector 50 minimizes the metric $$\sum_{t=1}^{L} \left| R_t - \sum_{i=1}^{n} c_t^i \gamma_i \right|^2$$

from amongst all possible codewords in a conventional manner. As can be seen, this approach reduces the complexity of decoding by almost a factor of m.

FIG. 2 depicts separate multipliers to multiply received signals by multiplication factors $\lambda_i$, and it depicts separate blocks for elements 30, 40, 45, and 50. It should be understood, however, that different embodiments are also possible. For example, it is quite conventional to incorporate all of the above-mentioned elements in a single special purpose processor, or in a single stored program controlled processor (or a small number of processors). Other modifications and improvements may also be incorporated, without departing from the spirit and scope of the invention, which is defined in the following claims.

What is claimed is:

1. A method for operating a receiver with an n plurality of antennas, the method comprising:
   obtaining n signals at the n plurality of antennas, transmitted from m antennas of a transmitter;
   developing, by a processor associated with the receiver, a sum signal that corresponds to the addition of the n signals that are each pre-multiplied by a respective factor $\lambda_j$, where j is an index integer specifying that factor $\lambda_j$ multiplies the signal received from antenna j of the n plurality of antennas,
   developing, by the processor, values for transfer functions $\alpha_{ij}$, where i is an index that references the transmitter antennas, and j is an index that references the antennas, wherein the factors $\lambda_j$ are developed from the transfer functions $\alpha_{ij}$; and
   detecting, by the processor, symbols transmitted by the m transmitter antennas embedded in the sum signal,
   wherein the factors $\lambda_j$ are components of a vector $\Lambda$, where the vector $\Lambda$ is an eigenvalue of $\Lambda A(\Lambda^*)^T$, and where A is a matrix containing the elements $\alpha_{ij}$.

2. The method of claim 1, wherein detecting, by the processor, symbols transmitted by the m transmitter antennas embedded in the sum signal comprises, comparing the sum signal to a signal corresponding to symbols $c^i$ transmitted by transmitter antenna i of said m transmitter antennas multiplied by corresponding factors $\gamma_i$.

3. The method of claim 2, wherein comparing the sum signal to a signal corresponding to symbols $c^i$ transmitted by transmitter antenna i of said m transmitter antennas multiplied by corresponding factors $\gamma_i$ comprises, comparing the sum signal to a signal corresponding to symbols $c^i$ transmitted by transmitter antenna i of said m transmitter antennas multiplied by corresponding factors $\gamma_i$, wherein the corresponding factor $\gamma_i$ is related to said factors $\lambda_j$ for j=1, 2, 3, . . . , m, and $\alpha_{ij}$.

4. The method of claim 2, wherein detecting, by the processor, symbols transmitted by the m transmitter embedded in the sum signal comprises, minimizing a metric $$\sum_{t=1}^{L} \left| R_t - \sum_{i=1}^{n} \gamma_i c_t^i \right|^2,$$

when $R_t$ is the sum signal at time interval t within a frame having L time intervals, and $c_t^i$ is the symbol that has been transmitted over transmitter antenna i at time interval t.

5. A method for operating a signal processing apparatus for use in a wireless receiver, wherein the wireless receiver forms part of a wireless system having a wireless transmitter employing multiple transmitting antennas, and wherein the wireless receiver includes at least two receiving antennas for receiving signals transmitted from the multiple transmitting antennas, the method comprising:
receiving, at an input section of the signal processing apparatus, multiple signals provided by the at least two receiving antennas;
developing, at a processing section of the signal processing apparatus, multiplying values from transfer function values that are associated with the multiple transmitting antennas and the at least two receiving antennas;
developing, at the processing section of the signal processing apparatus, a matrix from the transfer function values;
finding, at the processing section of the signal processing apparatus, eigenvalues of the matrix;
determining a maximum eigenvalue of the eigenvalues;
creating, at the processing section of the signal processing apparatus, an eigenvector of the matrix which corresponds to the maximum eigenvalue of the matrix;
generating, at the processing section of the signal processing apparatus, a subset of the set of all values of the received encoded symbols from the eigenvector;
multiplying, at a multiplying section of the signal processing apparatus, the received signals by the multiplying values to produce multiplied received signals; and
summing, at a summing section of the signal processing apparatus, the multiplied received signals.

6. The method of claim 5, wherein receiving, at the input section, multiple signals provided by the at least two receiving antennas comprises, receiving from the multiple transmitting antennas, encoded symbols in blocks of multiple time frames and, wherein a codeword comprises all encoded symbols transmitted within a time frame.

7. A method for operating a system for processing wireless data, the method comprising:
receiving, at an m number of receiving antennas associated with a system processor, a wireless signal, wherein the wireless signal represents multiple codewords; and
processing, at the system processor under a less than optimal computational process, the wireless signal to determine the codewords, wherein a number of computations is reduced by approximately a factor of m, at an increase in less than a factor of m in frame error probability from an optimal computational process, and wherein the optimal computational process computes all codewords.

8. The method of claim 7, wherein the wireless signal received at the m number of receiving antennas is transmitted by multiple transmitting antennas and is encoded under a space-time modulation scheme.

9. The method of claim 7 further comprising computing, at the system processor, eigenvectors based on the m number of receiving antennas.

10. The method of claim 7, wherein the wireless signal received at the m number of receiving antennas is transmitted by multiple transmitting antennas that transmit encoded symbols in blocks of multiple time frames and, wherein a codeword comprises all encoded symbols transmitted within a time frame.

11. The method of claim 1, wherein the values for transfer functions $\alpha_{ij}$ are developed based at least in part upon the n signals obtained at the n plurality of antennas.

12. The method of claim 5, wherein the transfer function values are developed based at least in part on the received multiple signals.

* * * * *